(12) United States Patent
Kim et al.

(10) Patent No.: US 12,044,643 B2
(45) Date of Patent: Jul. 23, 2024

(54) SENSOR TUBE OF HUMIDITY SENSOR, TUBE ASSEMBLY, AND HUMIDITY SENSOR SYSTEM

(71) Applicant: KOREA ATOMIC ENERGY RESEARCH INSTITUTE, Daejeon (KR)

(72) Inventors: Yeon Sik Kim, Sejong-si (KR); Tae Soon Kwon, Daejeon (KR); Dong Jin Euh, Daejeon (KR); Hae Seob Choi, Cheongju-si (KR); Woo Shik Kim, Seoul (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 901 days.

(21) Appl. No.: 17/085,657

(22) Filed: Oct. 30, 2020

(65) Prior Publication Data
US 2021/0140905 A1    May 13, 2021

(30) Foreign Application Priority Data
Nov. 8, 2019  (KR) .................. 10-2019-0142814

(51) Int. Cl.
*G01M 3/02*     (2006.01)
*F16K 31/122*   (2006.01)
(Continued)

(52) U.S. Cl.
CPC ........ *G01N 27/121* (2013.01); *F16K 31/1221* (2013.01); *G01M 3/02* (2013.01); *G01N 1/22* (2013.01); *G01N 27/223* (2013.01)

(58) Field of Classification Search
CPC .... G01N 19/10; G01N 21/3554; G01N 22/04; G01N 25/56; G01N 25/58; G01N 25/60;
(Continued)

(56) References Cited

U.S. PATENT DOCUMENTS 7,181,953 B1   2/2007  Street
9,903,395 B2   2/2018  Neff et al.
(Continued)

FOREIGN PATENT DOCUMENTS

CN    101523094 A    9/2009
CN    102187142 A    9/2011
(Continued)

OTHER PUBLICATIONS

Areva "FLUS Leak Detection System for Compartments and Components", Brochure.
(Continued)

*Primary Examiner* — Herbert K Roberts
(74) *Attorney, Agent, or Firm* — Harness, Dickey & Pierce, P.L.C.

(57) ABSTRACT

A sensor tube according to the present disclosure includes a body including a body extension having opposite ends connected to measurement air connection pipes and an opening, the measurement air connecting pipes being connected to a humidity sensor to deliver moisture to the humidity sensor using measurement air or allow the measurement air released from the humidity sensor to flow therethrough, and the opening being formed in the body extension to cause an interior space of the body extension and the outside to be in communication with each other such that the moisture is introduced into the interior space of the body extension from the outside through the opening, and an opening/closing part that selectively opens or closes the opening by being operated by a difference in pressure between the interior space of the body extension and the outside.

13 Claims, 8 Drawing Sheets

(51) Int. Cl.
*G01N 1/22* (2006.01)
*G01N 27/12* (2006.01)
*G01N 27/22* (2006.01)

(58) Field of Classification Search
CPC ........ G01N 25/62; G01N 25/64; G01N 25/66;
G01N 25/68; G01N 25/70; G01N 27/048;
G01N 27/121; G01N 27/223; G01N
27/605; G01N 31/222; G01N 2223/613;
F16K 31/1221
See application file for complete search history.

(56) References Cited

U.S. PATENT DOCUMENTS

| | | | |
|---|---|---|---|
| 10,578,223 | B2 | 3/2020 | Andreas et al. |
| 10,996,691 | B2 | 5/2021 | Nakano et al. |
| 11,058,976 | B2 | 7/2021 | Hawkins |
| 2006/0042701 | A1* | 3/2006 | Jansen ............... F16K 1/38 137/606 |
| 2010/0032605 | A1 | 2/2010 | Haege et al. |
| 2011/0132687 | A1 | 6/2011 | Ifield |
| 2013/0019745 | A1 | 1/2013 | Bagagli et al. |
| 2013/0062079 | A1 | 3/2013 | Bermes et al. |
| 2013/0174936 | A1 | 7/2013 | Maier et al. |
| 2014/0223899 | A1 | 8/2014 | Maier et al. |
| 2017/0241450 | A1 | 8/2017 | Neff et al. |
| 2018/0136672 | A1 | 5/2018 | Nakano et al. |
| 2019/0032803 | A1 | 1/2019 | Andreas et al. |
| 2019/0388814 | A1 | 12/2019 | Hawkins |
| 2021/0285551 | A1* | 9/2021 | Renollett ............ F16K 31/1262 |
| 2022/0011190 | A1 | 1/2022 | Kim et al. |

FOREIGN PATENT DOCUMENTS

| | | | |
|---|---|---|---|
| CN | 103196035 | A | 7/2013 |
| CN | 109996592 | A | 7/2019 |
| DE | 4125739 | A1 * | 2/1993 ............... G01N 1/16 |
| DE | 10 2006 048 976 | A1 | 5/2007 |
| EP | 2202496 | A2 | 6/2010 |
| EP | 3 872 484 | A1 | 9/2021 |
| GB | 836459 | A | 6/1960 |
| GB | 2113314 | A | 8/1983 |
| JP | 2007-114199 | A | 5/2007 |
| JP | 2009-008192 | A | 1/2009 |
| JP | 2012-251598 | A | 12/2012 |
| JP | 2015-102527 | A | 6/2015 |
| KR | 20-2000-0001129 | U | 1/2000 |
| KR | 100276242 | B1 | 1/2001 |
| KR | 10-2007-0042903 | A | 4/2007 |
| KR | 10-2014-0122962 | A | 10/2014 |
| KR | 101454202 | B1 | 11/2014 |
| KR | 10-2017-0099770 | A | 9/2017 |
| KR | 101796918 | B1 | 12/2017 |

OTHER PUBLICATIONS

Framatome "High-Sensitiviy Leak Detection and Localization and Humidity Measurement System" FLUS, pp. 1-2; dated 2018.
Chinese Office Action dated Dec. 23, 2022 issued in corresponding Chinese Appln. No. 202011229106.0 (with English translation).
Korean Notice of Allowance dated Jul. 1, 2021 issued in corresponding Korean Appln. No. Appl. No. 10-2019-0142814.
P. Jax and V. Streicher. 'FLÜS—A new monitoring system for leak detection and location' *Nuclear Society of Slovenia*, 2nd Regional Meeting: Nuclear Energy in Central Europe, 11.-14, 1995, pp. 402-408.
Office Action for Korean Application No. 10-2019-0142814 dated Dec. 28, 2020.
Chinese Notice of Allowance dated Sep. 20, 2023 for the corresponding Chinese Patent Application No. 202011229106.0.
German Office Action dated Oct. 23, 2023 issued in corresponding German Patent Application No. 10 2020 006 827.8.

* cited by examiner

SENSOR TUBE OF HUMIDITY SENSOR, TUBE ASSEMBLY, AND HUMIDITY SENSOR SYSTEM

CROSS-REFERENCE TO RELATED APPLICATION

This application claims the benefit of priority to Korean Patent Application No. 10-2019-0142814, filed in the Korean Intellectual Property Office on Nov. 8, 2019, the entire contents of which are incorporated herein by reference.

TECHNICAL FIELD

The present disclosure relates to a sensor tube for a humidity sensor that senses moisture caused by leakage steam, a humidity sensor assembly, a tube assembly, and a humidity sensor system.

BACKGROUND

The nuclear reactor coolant system regulation standard requires that reactor coolant leakage is detected for a reactor coolant pressure boundary and a leakage detection system for identifying a leakage source within an actually acceptable range is provided. Accordingly, various measures satisfying certain criteria are used to detect and identify reactor coolant leakage.

Because a reactor coolant system is operated at high temperature and high pressure, the reactor coolant system is surrounded by insulation. Accordingly, it is very difficult to detect leakage and identify a leakage source. A humidity sensor, called "FLUS", is used as a leakage detection device applied to the reactor coolant system.

As illustrated in FIG. 1, in the existing FLUS system, a side branch 101 protruding from one side of a T-shaped sensor tube 100 is filled with a porous material 102. External moisture is introduced into the sensor tube 100 through the porous material 102 by using diffusion, air circulating in a measurement air connection pipe 104 connected with the sensor tube 100 moves the moisture to a humidity sensor, and the humidity sensor senses a humidity change. The measurement air connection pipe 104 connected to the sensor tube 100 and the humidity sensor may be fastened to the sensor tube by using a fastening member 103 such as a nut. However, because the moisture is introduced into the sensor tube 100 by using diffusion through the side branch 101 filled with the porous material 102, the surface area of a region into which the moisture is able to infiltrate is very small. Accordingly, it takes a long time for the moisture to infiltrate inside (having a response time of at least 15 minutes to about 1 hour).

SUMMARY

The present disclosure has been made to solve the above-mentioned problems occurring in the prior art while advantages achieved by the prior art are maintained intact.

An aspect of the present disclosure provides a sensor tube, a humidity sensor assembly, a tube assembly, and a humidity sensor system for facilitating introduction of moisture into a humidity sensor assembly that detects moisture.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a sensor tube includes a body including a body extension having opposite ends connected to measurement air connection pipes and an opening, the measurement air connecting pipes being connected to a humidity sensor to deliver moisture to the humidity sensor using measurement air or allow the measurement air released from the humidity sensor to flow therethrough, and the opening being formed in the body extension to cause an interior space of the body extension and the outside to be in communication with each other such that the moisture is introduced into the interior space of the body extension from the outside through the opening, and an opening/closing part that selectively opens or closes the opening by being operated by a difference in pressure between the interior space of the body extension and the outside.

According to another aspect of the present disclosure, a tube assembly includes a body including a body extension having opposite ends to which measurement air connection pipes connected to a humidity sensor to deliver moisture to the humidity sensor using measurement air are connected, an opening formed in the body extension such that the moisture is introduced into an interior space of the body extension from the outside through the opening, a piston opening formed in the body extension, and a body connection that protrudes outward from the body extension and surrounds the piston opening, an opening/closing part including a valve body that moves upward or downward to selectively open or close the opening and a piston that is slidably coupled to the body connection to raise or lower the valve body and that divides an inside space in communication with the interior space and an outside space from each other, the piston being operated by a difference between pressure in the inside space and pressure in the outside space, and a fitting that is coupled to the body connection to supply, into the outside space, pressure control air to form the pressure in the outside space and that has an interior space in communication with the outside space.

According to another aspect of the present disclosure, a humidity sensor system includes a humidity sensor that obtains humidity in air delivered thereto, a sensor tube including a body having an opening formed therein and an opening/closing part driven by pneumatic pressure to adjust opening/closing of the opening, the sensor tube being formed to selectively allow or block introduction of moisture into the body from the outside, a pressure generator that supplies pressure control air flowing outside the opening/closing part to provide a pressure difference between the inside and the outside of the opening/closing part to operate the opening/closing part, and a fitting that is coupled to the body while covering the outside of the opening/closing part and that supplies, to the outside of the opening/closing part, the pressure control air delivered from the pressure generator.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
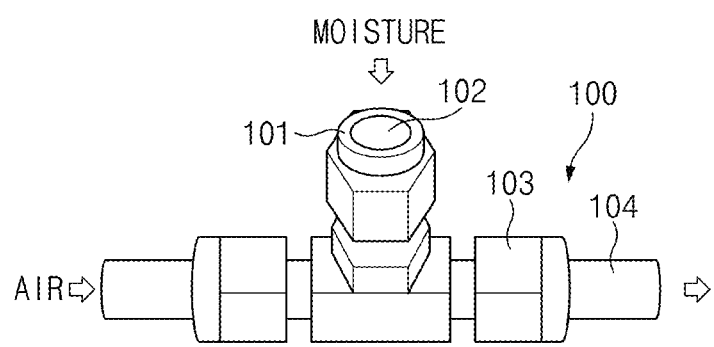
FIG. 1 is a perspective view of a T-shaped sensor tube in the related art.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

Figure 2:
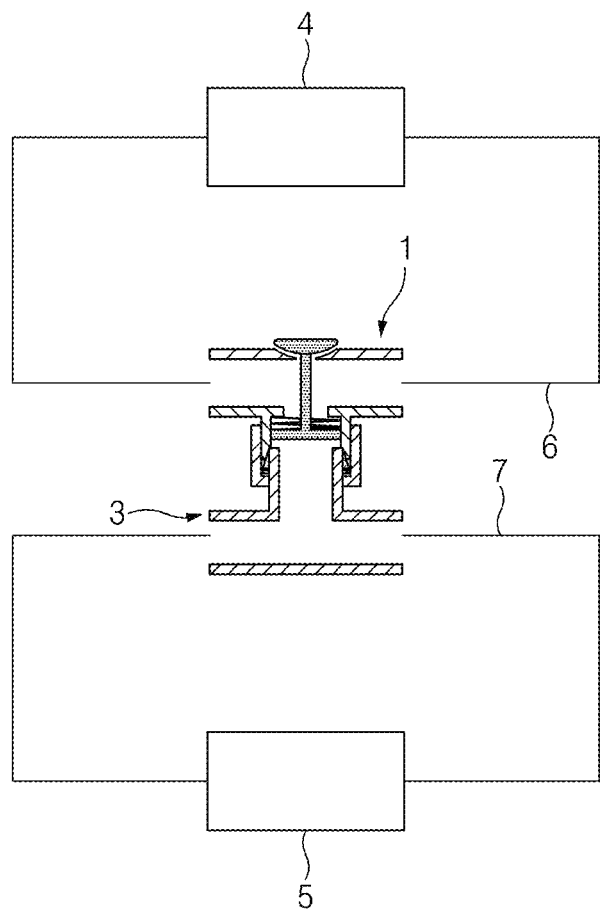
FIG. 2 is a conceptual diagram of a humidity sensor system according to an embodiment of the present disclosure.
Figure 3:
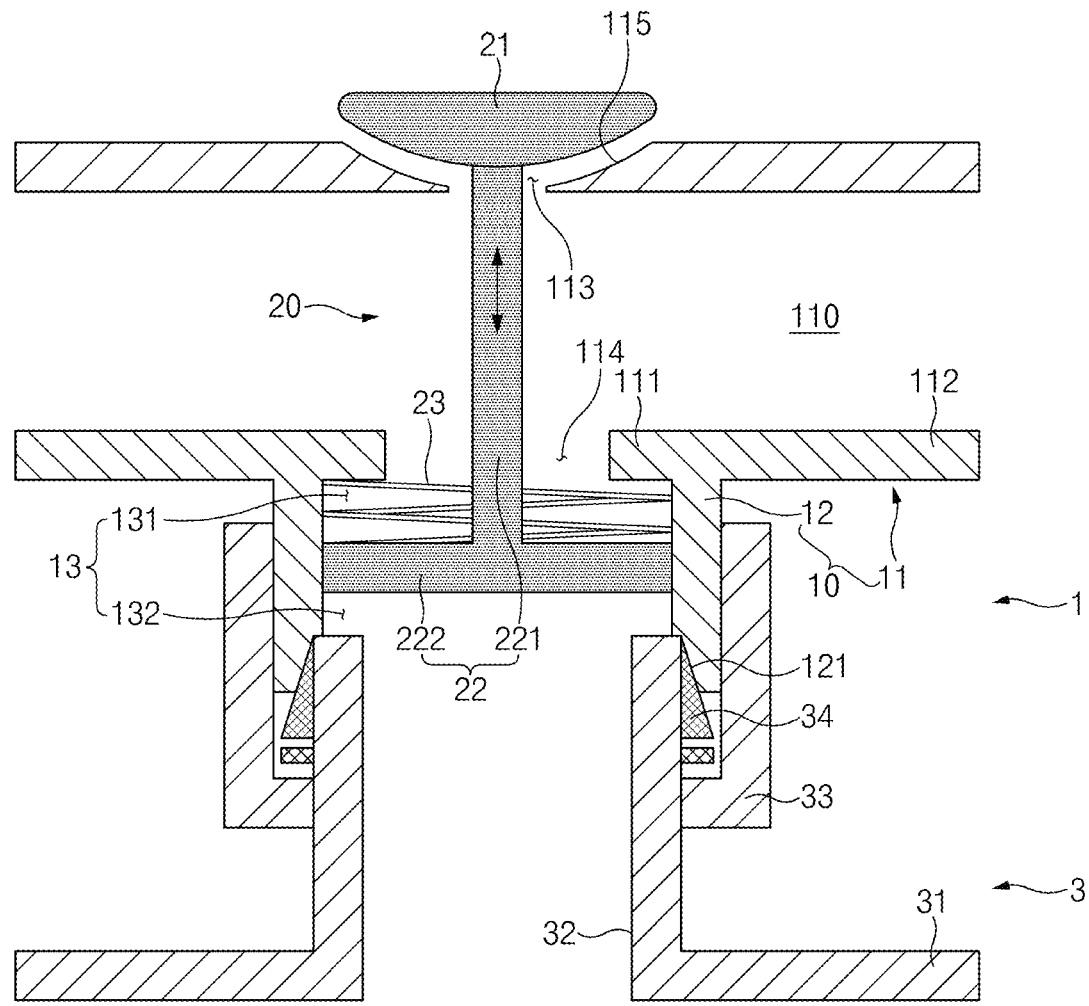
FIG. 3 is a sectional view of a tube assembly according to an embodiment of the present disclosure.

FIG. 2 is a conceptual diagram of a humidity sensor system according to an embodiment of the present disclosure. FIG. 3 is a sectional view of a tube assembly according to an embodiment of the present disclosure.

Referring to FIGS. 2 and 3, the humidity sensor system for obtaining outside humidity, according to an embodiment of the present disclosure, includes a humidity sensor assembly, a fitting 3, pressure control air connection pipes 7, and a pressure generator 5. The humidity sensor assembly, which is an assembly for measuring humidity from moisture-containing measurement air introduced inside, may include a humidity sensor 4, measurement air connection pipes 6, and a sensor tube 1. The humidity sensor 4 and the fitting 3 may constitute the tube assembly having a portion that is supplied with measurement air and pressure control air and is opened or closed by a pressure difference.

Descriptions of upper, lower, left, right, front, and rear directions used herein are for a better understanding, and the upper, lower, left, right, front, and rear directions are not limited to the described contents and may be changed depending on a position in which the humidity sensor system is placed.

The measurement air connection pipes 6 and the pressure control air connection pipes 7 are conceptually illustrated by solid lines. The measurement air connection pipes 6 and the pressure control air connection pipes 7 may be tubes or pipes having the same inner diameter as the connected tube assembly.

Pressure Generator 5 and Pressure Control Air Connection Pipes 7

The pressure generator 5 forces pressure control air into the fitting 3. Accordingly, the pressure generator 5 may include an air pump. The pressure generator 5 may be connected with the fitting 3 through the pressure control air connection pipes 7 and may deliver the pressure control air to the fitting 3 through the pressure control air connection pipes 7, or may receive the pressure control air from the fitting 3 through the pressure control air connection pipes 7. The pressure generator 5 may increase or decrease the pressure of the pressure control air in the pressure control air connection pipes 7 to increase or decrease the pressure in an interior space of the fitting 3 connected to the pressure control air connection pipes 7.

The pressure control air connection pipes 7 connect the fitting 3 and the pressure generator 5 and allow the pressure control air to flow between the fitting 3 and the pressure generator 5. In a case where the humidity sensor system includes one pressure generator 5 and one fitting 3, two pressure control air connection pipes 7 may be provided. One of the two pressure control air connection pipes 7 may connect an inlet of the pressure generator 5 and one end of the fitting 3, and the other may connect an outlet of the pressure generator 5 and an opposite end of the fitting 3. Accordingly, the fitting 3 may connect ends of the pressure control air connection pipes 7.

Humidity Sensor 4 and Measurement Air Connection Pipes 6

The humidity sensor 4, which is a component for obtaining humidity in measurement air delivered thereto, may be a humidity sensor 4 of a FLUS type. However, the type of the humidity sensor 4 is not limited to the aforementioned type, as long as the humidity sensor 4 is capable of obtaining the amount of moisture contained in measurement air delivered thereto.

The humidity sensor 4 has an inlet and an outlet. The humidity sensor 4 receives moisture-containing measurement air from the sensor tube 1, which will be described below, through the inlet and releases the measurement air through the outlet.

The measurement air connection pipes 6 connect the sensor tube 1 and the humidity sensor 4 and allow the measurement air to flow between the humidity sensor 4 and the sensor tube 1. Two measurement air connection pipes 6 may be provided. One of the two measurement air connection pipes 6 may connect one end of the sensor tube 1 and the outlet of the humidity sensor 4, and the other may connect an opposite end of the sensor tube 1 and the inlet of the humidity sensor 4. Accordingly, the sensor tube 1 may connect ends of the measurement air connection pipes 6.

One of the measurement air connection pipes 6 may serve to deliver the measurement air to the sensor tube 1, and the other may serve to deliver, to the humidity sensor 4, the measurement air mixed with moisture in the sensor tube 1 and released from the sensor tube 1.

Sensor Tube 1

The sensor tube 1 may include a body 10 and an opening/closing part 20. The body 10 may include a body extension 11 and an opening 113 and may include a body connection 12 and a piston opening 114. The body extension 11 is a component that connects the two measurement air connection pipes 6 that are connected with the humidity sensor 4 to deliver moisture to the humidity sensor 4 using the measurement air or allow the measurement air released from the humidity sensor 4 to flow therethrough. The body extension 11 is formed in the form of a pipe extending in one direction and has an empty interior space 110 formed therein. The measurement air may flow through the interior space 110. Although the body extension 11 is illustrated as extending along the horizontal direction, the direction in which the body extension 11 extends is not limited thereto.

The body extension 11 has the opening 113 formed therein. The opening 113 is formed by cutting away a portion from the body extension 11 and enables a flow of fluid between the interior space 110 of the body extension 11 and the outside. Accordingly, measurement air in the interior space 110 of the body extension 11 may be released to the outside through the opening 113, and air and external moisture may be introduced into the interior space 110 of the body extension 11 from the outside. The external moisture may be generated by leakage steam.

The body extension 11 may include a valve seat 115 that surrounds and defines the opening 113. The valve seat 115 may be formed in a shape corresponding to the shape of a valve body 21, which will be described below, such that the valve body 21, when making contact with the valve seat 115, closes the opening 113 to isolate the interior space 110 of the body extension 11 from the outside. Specifically, the valve seat 115 may have a decreasing width toward the inside from the outside of the body extension 11. When viewed from outside the body extension 11, the valve seat 115 may have an inwardly concave shape. However, the shape of the valve seat 115 is not limited thereto.

The body 10 may include the piston opening 114 formed by cutting away a portion from the body extension 11. The piston opening 114, together with the opening 113, may be located on one diameter of the body extension 11. Accordingly, the piston opening 114 and the opening 113 may be disposed in positions symmetric to each other with respect to the center of the body extension 11 and may be open to face away from each other. The piston opening 114 may have a smaller cross-sectional area than the opening 113.

The body extension 11 may include a piston opening surrounding portion 111 that surrounds and defines the piston opening 114. The piston opening surrounding portion 111 may have a shape that protrudes inward from the body connection 12, which will be described below, in the radial direction. The body extension 11 may be divided into the piston opening surrounding portion 111 located inward of the body connection 12 and an outside portion 112 located outward of the body connection 12 and connected to the measurement air connection pipes 6.

The body connection 12 surrounds the piston opening 114 and protrudes outward from the body extension 11. Accordingly, likewise to the body extension 11, the body connection 12 may be formed in the form of a pipe. However, an inside surface of the body connection 12 may be disposed to be spaced apart from the piston opening 14 such that the body connection 12 has a larger transverse cross-sectional area than the piston opening 114.

The piston opening 114 may be formed in a lower portion of the body extension 11 in the drawing, and the body connection may protrude downward from the body extension 11 while surrounding the piston opening 114. As illustrated, the body connection 12 may protrude in a direction perpendicular to the direction in which the body extension 11 extends, and the body 10 may have the shape of "T" as a whole.

The body connection 12 is coupled with the fitting 3 that will be described below. The body connection 12 may be coupled with a fitting connection 32. The sensor tube 1 and the fitting 3 are coupled through the body connection 12 and the fitting connection 32 to form the tube assembly having the shape of "H".

Part of a piston 22 may make contact with the inside surface of the body connection 12 so as to slide thereon. Accordingly, the body connection 12 may serve as a cylinder required for motion of the piston 22.

The opening/closing part 20 is a component that adjusts opening/closing of the opening 113 by being driven by pneumatic pressure. The opening/closing part 20 may include the valve body 21 and the piston 22, and the piston 22 may include a piston rod 221 and a piston plate 222.

The valve body 21 is vertically raised or lowered to selectively open or close the opening 113. The valve body 21 may move inward from outside the body extension 11 to make contact with the valve seat 115 to close the opening 113. In the state in which the opening 113 is closed, the valve body 21 may move outside the body extension 11 to escape from the valve seat 115 to open the opening 113.

The valve body 21 may have a decreasing width toward the inside from the outside of the body extension 11. The valve body 21 may have a shape convex toward the interior space 110 of the body extension 11. The valve seat 115 may have a shape corresponding to the shape of the valve body 21, and when the valve body 21 is seated on and brought into contact with the valve seat 115, the valve body 21 may divide the interior space 110 of the body extension 11 from the outside, thereby maintaining air-tightness.

In addition to that illustrated, the valve body 21 may have a vertical cross-section in an inverted triangular or hemispherical shape, and the valve seat 115 may be formed in a shape similar to an inside surface of a circular pipe. Accordingly, the valve body 21 and the valve seat 115 may be in substantially line contact with each other along an annular line.

The piston rod 221 connects the piston plate 222 and the valve body 21. The piston rod 221 may vertically extend in the drawing. One end of the piston rod 221 may be coupled to a lower end of the valve body 21, and an opposite end of the piston rod 221 may be coupled to the piston plate 222. Accordingly, the piston rod 221 may be across the interior space 110 of the body extension 11.

The piston rod 221 may pass through the piston opening 114. The piston rod 221 is inserted into the piston opening 114, but does not completely close the piston opening 114. Accordingly, the interior space 110 of the body extension 11 may be in communication with an inside space 131 of the body connection 12 through the piston opening 114.

The piston plate 222 is disposed inside the body connection 12 and is moved by a pressure difference between above and below the piston plate 222 to raise or lower the valve body 21. The piston plate 222 may be formed in a plate shape and may make contact with the inside surface of the body connection 12 so as to vertically slide. The piston plate 222 may divide an interior space 13 of the body connection 12 into the inside space 131 in communication with the interior space 110 of the body extension 11 and an outside space 132 in communication with an interior space of the fitting 3 that will be described below. In the drawing, the inside space 131 is illustrated as being disposed on an upper side of the piston plate 222, and the outside space 132 is illustrated as being disposed on a lower side of the piston plate 222.

The piston plate 222 may be slid to a low pressure side by a difference between the pressure of the measurement air flowing in the inside space 131 and the pressure of the pressure control air flowing in the outside space 132 to raise or lower the opening/closing part 20, thereby opening or closing the opening 113.

The opening/closing part 20 may further include an elastic member 23. The elastic member 23 may be disposed between an outside surface of the piston opening surrounding portion 111 of the body 10 and a surface of the piston plate 222 that faces toward the body extension 11, and opposite ends of the elastic member 23 may be connected to the outside surface of the piston opening surrounding portion 111 and the surface of the piston plate 222. The elastic member 23 is formed of a material having elasticity. The elastic member 23 applies an elastic force to the piston 22 to locate the piston 22 in a predetermined default position. The default position may be a position in which the valve body 21 closes the opening 113 when the pressure of the measurement air is the same as the pressure of the pressure control air.

The elastic members 23 may be a coil spring. Without being limited thereto, however, the elastic member 23 may be implemented with a member having a property of returning to the original state by elasticity.

Fitting 3

The fitting 3 is connected to the sensor tube 1 and supplies the pressure control air to enable the opening 113 to be opened or closed by a pressure difference. Specifically, the fitting 3 may be coupled to the body connection 12 to supply, into the outside space 132, the pressure control air that is to form the pressure in the outside space 132. When the fitting 3 is coupled to the body connection 12, the interior space of the fitting 3 may be in communication with the outside space 132.

The fitting 3 may include a fitting extension 31 and the fitting connection 32. The fitting extension 31 may connect the two pressure control air connection pipes 7 that deliver the pressure control air. The fitting extension 31 may be formed parallel to the body extension 11. The fitting extension 31 may be formed in the form of a pipe.

The fitting connection 32 protrudes outward from the fitting extension 31. As illustrated in the drawing, the fitting connection 32 may protrude upward from the fitting extension 31. The fitting connection 32 may protrude in a direction perpendicular to the direction in which the fitting extension 31 extends, and the fitting 3 may have the shape of "T" as a whole.

The fitting connection 32 may also be formed in the form of a pipe. Accordingly, an interior space 310 of the fitting extension 31 and an interior space of the fitting connection 32 may be in communication with each other.

The fitting connection 32 may be coupled with the body connection 12. Accordingly, as described above, the tube assembly may be formed in the shape of "H". As the fitting connection 32 and the body connection 12 are coupled together, the interior space of the fitting connection 32 and the outside space 132 of the body connection 12 may be in communication with each other. Accordingly, the fitting connection 32 may serve as part of a cylinder that delivers the pressure control air to the piston 22.

As illustrated, the fitting connection 32 may be coupled to the body connection 12 by being inserted into the body connection 12. Accordingly, the piston plate 222, which makes contact with the inside surface of the body connection 12 so as to slide thereon, may be stopped by a step formed by the fitting connection 32, and a movement of the piston plate 222 toward the inside of the fitting 3 may be blocked.

The fitting 3 may further include a ferrule 34 to maintain air-tightness better when the fitting connection 32 is inserted into and coupled to the body connection 12. The ferrule 34 may be formed in an annular shape that surrounds an outside surface of the fitting connection 32 and may be disposed on the outside surface of the fitting connection 32. As illustrated, the ferrule 34 may have a shape having a decreasing width toward a distal end of the fitting connection 32. Furthermore, when viewed in the vertical cross-section, an inclined coupling surface 121 may be formed on the inside surface of the body connection 12 in a shape corresponding to the shape of the ferrule 34. The ferrule 34 may be disposed between the fitting connection 32 and the body connection 12 to more firmly maintain air-tightness. A plurality of ferrules 34 may be disposed.

To maintain air-tightness better, the fitting 3 may further include a fitting coupling 33. The fitting coupling 33 may be coupled to the fitting connection 32 and the body connection 12 while covering the fitting connection 32 and the body connection 12 in the position where the fitting connection 32 and the body connection 12 are coupled together. The fitting connection 32 and the body connection 12 may each have an external male thread formed on the outside surface thereof, and the fitting coupling 33 may have an internal female thread formed on the inside surface thereof. The fitting coupling 33 may be threaded onto the fitting connection 32 and the body connection 12. However, the method by which the fitting coupling 33 is coupled to the fitting connection 32 and the body connection 12 is not limited thereto.

Figure 4:
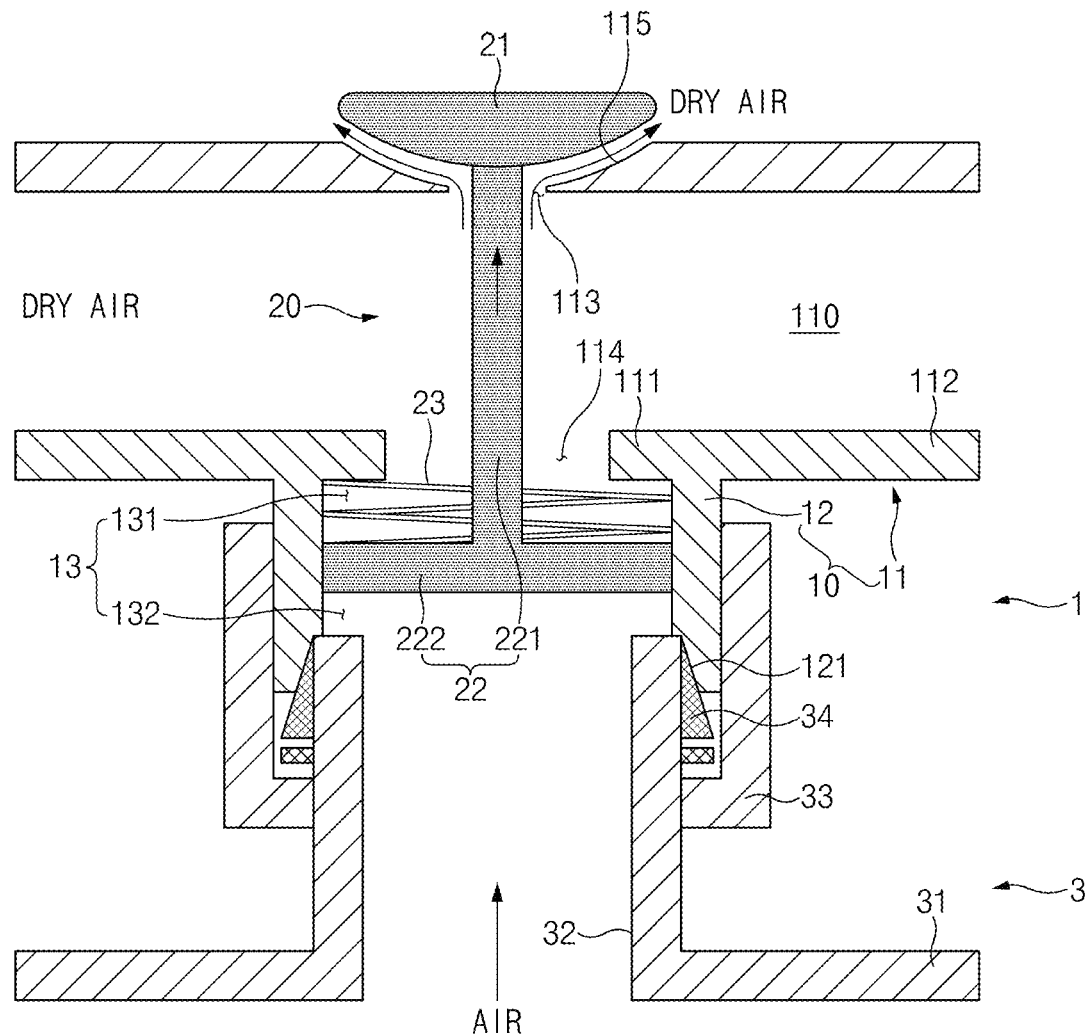
FIG. 4 is a sectional view illustrating a situation in which air is partly released through an opening opened by an opening/closing part according to an embodiment of the present disclosure.

FIG. 4 is a sectional view illustrating a situation in which air is partly released through the opening 113 opened by the opening/closing part 20 according to an embodiment of the present disclosure.

The piston plate 222 may be slid to a low pressure side by a difference between the pressure of the measurement air flowing in the inside space 131 and the pressure of the pressure control air flowing in the outside space 132. The piston plate 222 may be raised or lowered by the pressure difference, and the valve body 21 connected to the piston plate 222 through the piston rod 221 may be raised or lowered.

When the pressure of the pressure control air is higher than the pressure of the measurement air, the piston 22 may be raised so that the opening 113 is opened, and moisture and air may be introduced into the interior space 110 of the body extension 11 from the outside. In contrast, when the pressure of the measurement air is higher than the pressure of the pressure control air, the piston 22 may be lowered so that the opening 113 is closed, and fluid may be stopped from entering or exiting the body extension 11 through the opening 113.

In the case of FIG. 4, the pressure of the pressure control air flowing in the outside space 132 is increased by the pressure generator 5. Meanwhile, as there is no change in the measurement air in the inside space 131, the pressure in the outside space 132 is higher than the pressure in the inside space 131. Accordingly, the piston 22 is pressed upward by the pressure difference, and the opening/closing part 20 is raised.

The opening/closing part 20 may open the opening 113 while being raised. The dry measurement air in the interior space 110 of the body extension 11 may be partly released to the outside through the opening 113.

Figure 5:
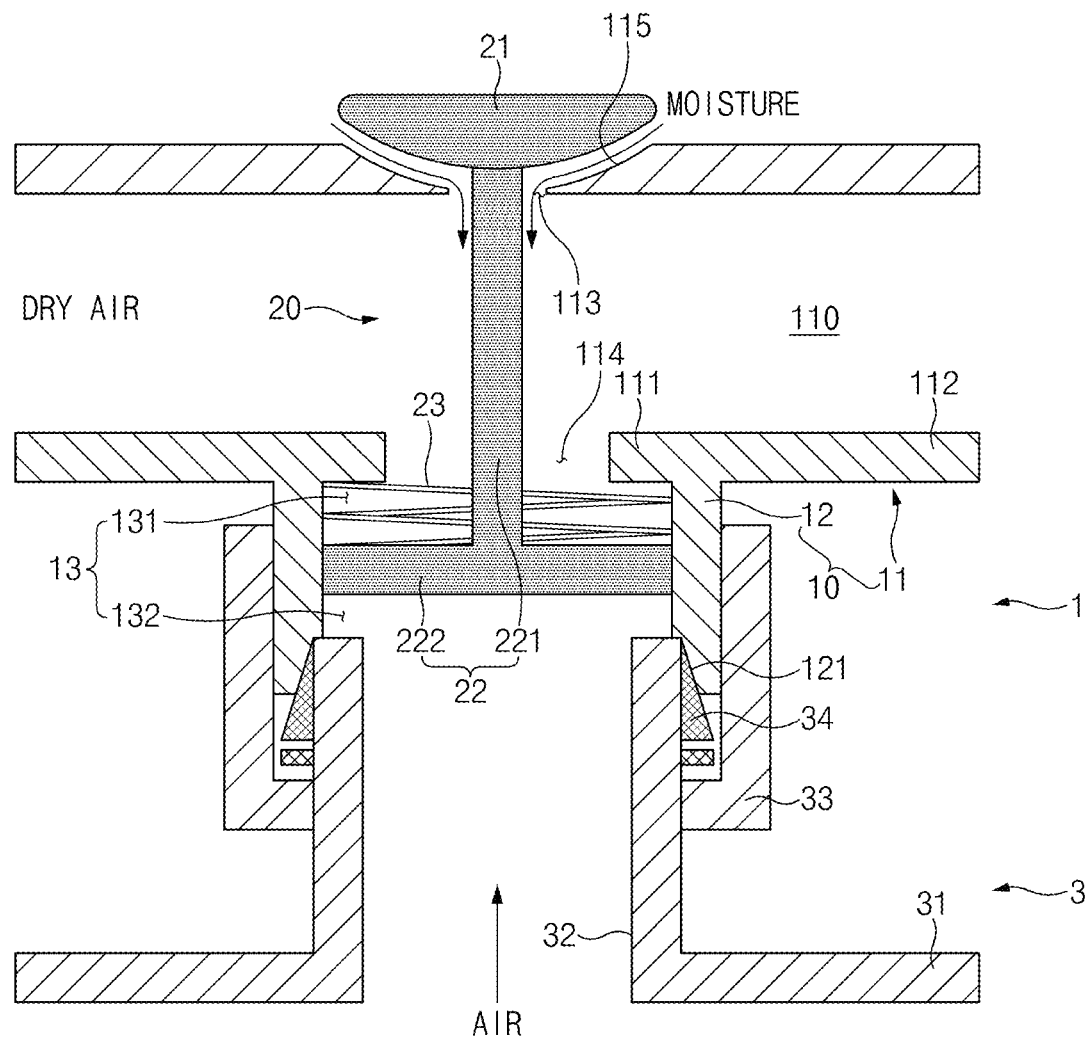
FIG. 5 is a sectional view illustrating a situation in which moisture is introduced with the opening opened by the opening/closing part according to an embodiment of the present disclosure.

FIG. 5 is a sectional view illustrating a situation in which moisture is introduced with the opening 113 opened by the opening/closing part 20 according to an embodiment of the present disclosure.

Referring to FIG. 5, the pressure generator 5 supplies air into the outside space 132 at a predetermined pressure, and the opening/closing part 20 opens the opening 113. After a small amount of dry air is released as illustrated in FIG. 4, external air and moisture may be introduced into the interior space 110 of the body extension 11 due to a difference in moisture concentration between the inside and the outside of the body extension 11.

The introduced moisture may be delivered to the humidity sensor 4 through the measurement air connection pipes 6 by the measurement air flowing in the interior space 110 of the body extension 11.

Figure 6:
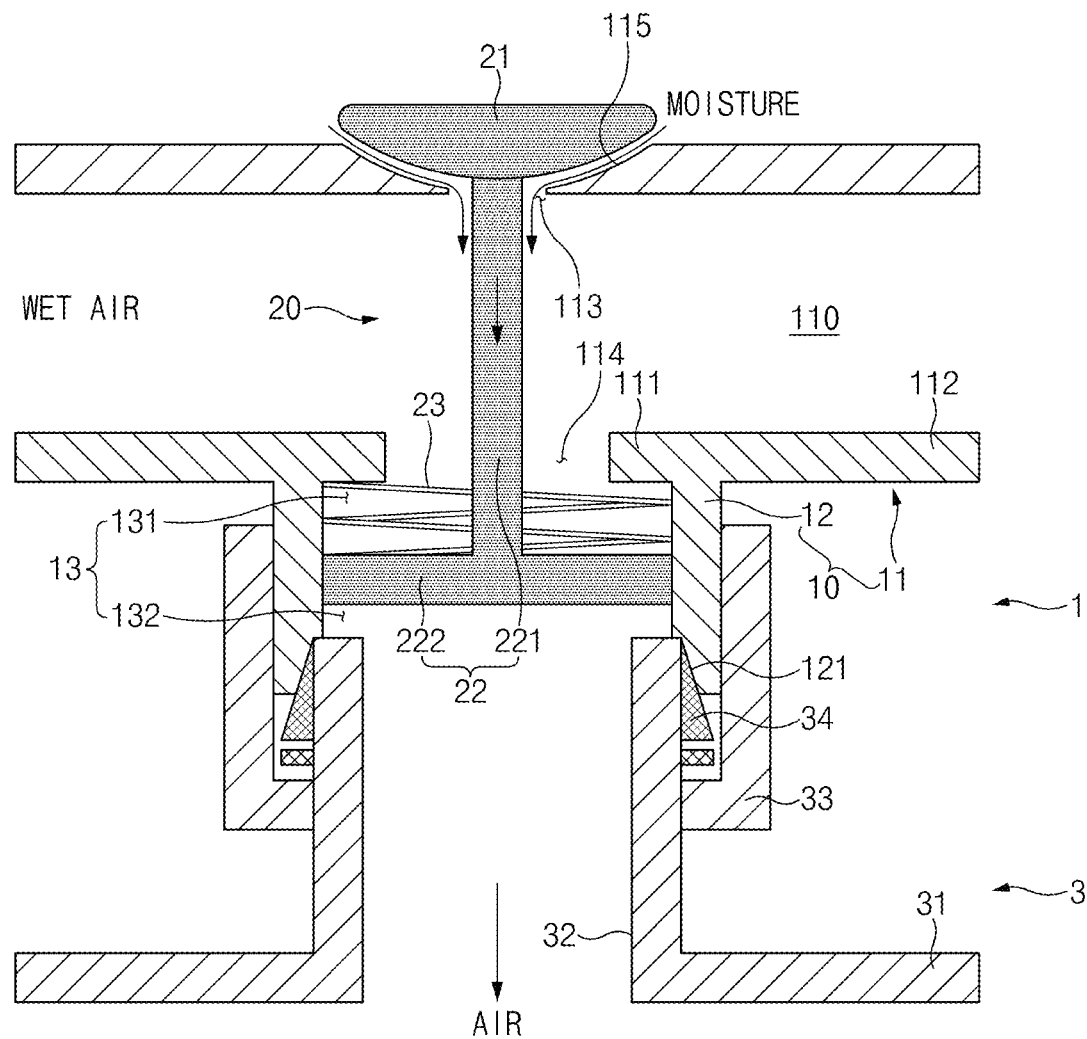
FIG. 6 is a sectional view illustrating a situation in which the opening/closing part closes the opening according to an embodiment of the present disclosure.

FIG. 6 is a sectional view illustrating a situation in which the opening/closing part 20 closes the opening 113 according to an embodiment of the present disclosure.

Referring to FIG. 6, the pressure of the pressure control air flowing in the outside space 132 is decreased by the pressure generator 5. Meanwhile, because the opening 113 remains open, moisture is introduced into the inside space 131 to change the measurement air in the inside space 131 to moist air, and in this state, there is no change. Accordingly, the pressure in the outside space 132 becomes lower than the pressure in the inside space 131 so that the piston 22 is pressed downward and the opening/closing part 20 is lowered. Furthermore, the pressure in the outside space 132 decreases and becomes similar to the pressure in the inside space 131, and the piston 22 is lowered by the elastic force of the elastic member 23. The opening/closing part 20 is lowered and seated on the valve seat 15 to close the opening 113. When the opening 113 is closed, the inside space 131 is increased, and negative pressure is generated. Therefore, in the closing process, more external moisture may be introduced.

Referring to the operations of FIGS. 4 to 6, by controlling an upward or downward movement of the opening/closing part 20 depending on the pressure of the pressure control air, external moisture may be easily introduced into the sensor tube 1 and may be delivered to the humidity sensor 4 by using the measurement air. A higher response speed may be obtained by allowing the moisture to more rapidly infiltrate through the sensor tube 1. In addition, the moisture or the measurement air may be prevented from being leaked from the sensor tube 1.

Figure 7:
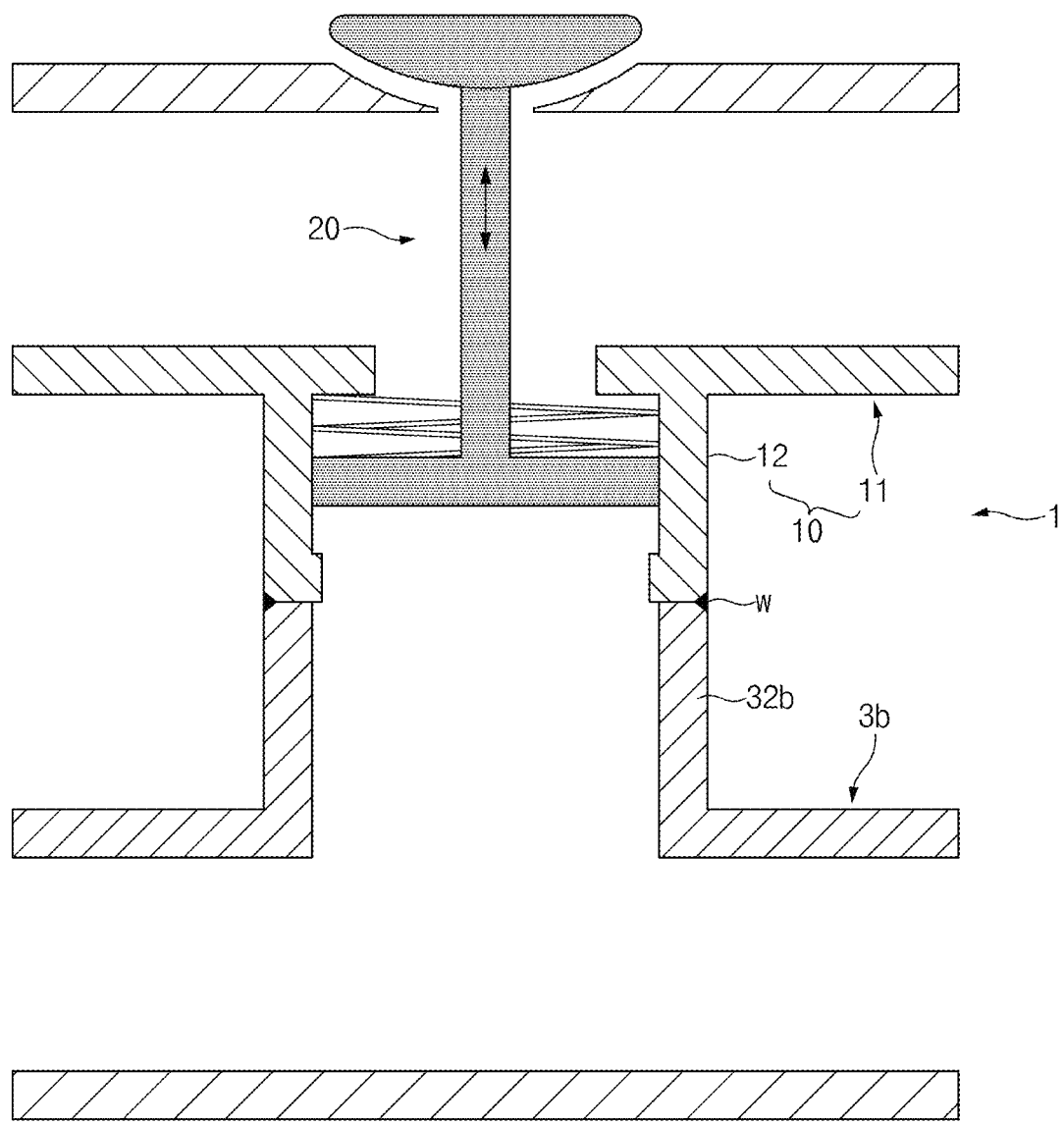
FIG. 7 is a sectional view of a tube assembly according to a modified example of the embodiment of the present disclosure.

FIG. 7 is a sectional view of a tube assembly according to a modified example of the embodiment of the present disclosure.

According to the modified example of the embodiment of the present disclosure, the tube assembly may include a fitting 3b including a fitting connection 32b coupled to the body connection 12 in a state of not being inserted into the body connection 12. In this case, the body connection 12 and the fitting connection 32 may be coupled with each other by forming a welding joint W on the surfaces through welding.

Figure 8:
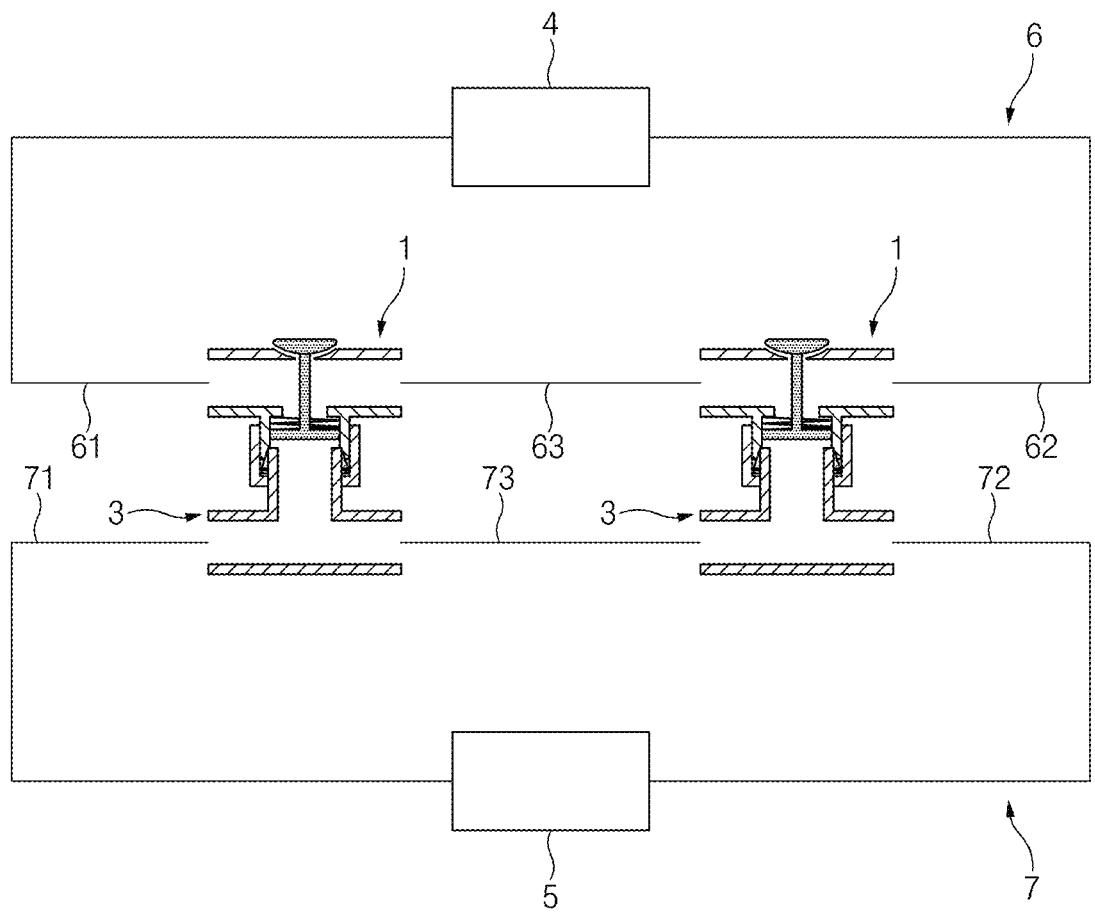
FIG. 8 is a conceptual diagram of a humidity sensor system according to a modified example of the embodiment of the present disclosure.

FIG. 8 is a conceptual diagram of a humidity sensor system according to a modified example of the embodiment of the present disclosure.

According to the modified example of the embodiment of the present disclosure, the humidity sensor system may include a plurality of tube assemblies, and the tube assemblies may be arranged. The tube assemblies may be connected in series along the direction in which the body extension 11 extends.

The outermost sensor tubes 1 may be connected with the humidity sensor 4 through outer measurement air connection pipes 61 and 62, and the sensor tubes 1 adjacent to each other may be connected through an intermediate measurement air connection pipe 63. Likewise, the outermost fittings 3 may be connected with the pressure generator 5 through outer pressure control air connection pipes 71 and 72, and the fittings 3 adjacent to each other may be connected through an intermediate pressure control air connection pipe 73.

Even though the plurality of tube assemblies having the shape of "H" are used in the state of being connected in series along the direction in which the body extension 11 extends, too many connection pipes and too much space may be prevented from being occupied, and the tube assemblies may be connected in an easy and simple manner.

Accordingly, a higher response speed may be obtained by enabling moisture to more rapidly infiltrate through the sensor tube.

Moisture or measurement air may be prevented from being leaked from the sensor tube.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A sensor tube comprising:
a body including a body extension, an opening, a piston opening, and a body connection, the body extension having opposite ends configured to be connected to measurement air connection pipes, the measurement air connection pipes connected to a humidity sensor to deliver moisture to the humidity sensor using measurement air or to allow the measurement air released from the humidity sensor to flow therethrough, the opening defined in the body extension to cause an interior space of the body extension and an outside to be in communication with each other such that the moisture is introduced into the interior space of the body extension from the outside through the opening, the piston opening defined in the body extension, the body connection protruding outward from the body extension and configured to surround the piston opening;

a fitting coupled to the body connection and configured to supply pressure control air; and an opening/closing part configured to selectively open or close the opening by being operated by a difference in pressure between the interior space of the body extension and the outside, wherein the piston opening is configured to cause the interior space of the body extension and an inside space of the body connection to be in communication with each other, and an inside surface of the body connection includes an inclined portion, which is configured to mate with the fitting.

2. The sensor tube of claim 1, wherein the opening/closing part includes a valve body configured to selectively open or close the opening by covering the opening or escaping from the opening such that external moisture is introduced into the interior space, and a piston configured to raise or lower the valve body and slidably coupled to the body connection, the piston divides a space in the body connection into the inside space of the body connection and an outside space of the body connection, the inside space of the body connection being in communication with the interior space of the body connection, and the piston is raised or lowered by a difference between pressure in the interior space of the body connection and pressure in the outside space of the body connection.

3. The sensor tube of claim 2, wherein the piston includes a piston plate having an outside surface configured to make contact with the inside surface of the body connection so as to slide thereon and a piston rod across the interior space, the piston rod being configured to connect the piston plate and the valve body.

4. The sensor tube of claim 2, wherein the valve body has a shape convex toward the interior space of the body extension, and the body extension includes a valve seat on which the valve body is seated, the valve seat configured to surround and define the opening and being in a shape corresponding to the valve body.

5. The sensor tube of claim 2, wherein the opening/closing part further includes an elastic member connected to the piston and the body and configured to apply an elastic force to locate the piston in a default position.

6. The sensor tube of claim 5, wherein the elastic member is in the inside space of the body connection, and opposite ends of the elastic member are connected to an outside surface of the body extension and a surface of the piston facing the body extension.

7. The sensor tube of claim 5, wherein the default position is a position in which the valve body closes the opening.

8. The sensor tube of claim 2, wherein the body extension is in a pipe shape, and the opening and the piston opening are on an annular circumference of the body extension.

9. The sensor tube of claim 2, wherein the piston passes through the piston opening while not closing the piston opening.

10. A tube assembly comprising:

a body including a body extension, an opening, a piston opening, and a body connection, the body extension having opposite ends to which measurement air connection pipes connected to a humidity sensor to deliver moisture to the humidity sensor using measurement air are connected, the opening defined in the body extension such that the moisture is introduced into an interior space of the body extension from an outside through the opening, the piston opening defined in the body extension, and the body connection protruding outward from the body extension, the body connection configured to surround the piston opening;

an opening/closing part including a valve body configured to move upward or downward to selectively open or close the opening and a piston slidably coupled to the body connection to raise or lower the valve body and configured to divide a space into an inside space and an outside space, wherein the piston is configured to operate based on a difference between a pressure in the inside space and a pressure in the outside space; and a fitting coupled to the body connection and configured to supply, into the outside space, pressure control air to control the pressure in the outside space, the fitting having an interior space in communication with the outside space, wherein an inside surface of the body connection includes an inclined portion, which is configured to mate with the fitting.

11. The tube assembly of claim 10, wherein the fitting includes a fitting extension being parallel to the body extension and having opposite ends to which pressure control air connection pipes configured to deliver the pressure control air are connected.

12. A humidity sensor system comprising:

a humidity sensor configured to obtain humidity in air delivered thereto;

a sensor tube including a body having an opening defined therein and an opening/closing part configured to be driven by pneumatic pressure to adjust opening/closing of the opening, the sensor tube configured to selectively allow or block introduction of moisture into the body from an outside;

a pressure generator configured to operate the opening/closing part by supplying pressure control air flowing through an outside space of the opening/closing part to provide a pressure difference between an inside space of the opening/closing part and the outside space of the opening/closing part; and a fitting coupled to the body while covering an outside of the opening/closing part and configured to supply therethrough the pressure control air delivered from the pressure generator, wherein the body further includes a body extension having opposite ends configured to be connected to measurement air connection pipes, the measurement air connection pipes connected to a humidity sensor to deliver moisture to the humidity sensor using measurement air or to allow the measurement air released from the humidity sensor to flow therethrough, and the opening defined in the body extension to cause an interior space of the body extension and the outside to be in communication with each other such that the moisture is introduced into the interior space of the body extension from the outside through the opening, the body further includes,
- a piston opening defined in the body extension to cause the interior space of the body extension and an outside space of a body connection to be in communication with each other, and
- the body connection protruding outward from the body extension, the body connection configured to surround the piston opening, and an inclined coupling surface is formed on an inside surface of the body connection, which is configured to mate with the fitting.

13. The humidity sensor system of claim 12, wherein the fitting includes,
- a fitting extension extending parallel to the body extension, and
- a fitting connection protruding outward from the fitting extension and coupled with the body connection such that the sensor tube and the fitting connection provide an H-shaped tube assembly, and the H-shaped tube assembly includes a plurality of H-shaped tube assemblies connected in series along a direction in which the body extension extends.

* * * * *